(12) United States Patent
Nose

(10) Patent No.: US 9,537,146 B2
(45) Date of Patent: Jan. 3, 2017

(54) POSITIVE ELECTRODE MATERIAL FOR SODIUM BATTERIES AND METHOD FOR PRODUCING SAME

(71) Applicant: TOYOTA JIDOSHA KABUSHIKI KAISHA, Toyota-shi, Aichi (JP)

(72) Inventor: Masafumi Nose, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 48 days.

(21) Appl. No.: 14/405,830

(22) PCT Filed: May 10, 2013

(86) PCT No.: PCT/JP2013/063217
§ 371 (c)(1),
(2) Date: Dec. 5, 2014

(87) PCT Pub. No.: WO2013/187160
PCT Pub. Date: Dec. 19, 2013

(65) Prior Publication Data
US 2015/0180024 A1    Jun. 25, 2015

(30) Foreign Application Priority Data

Jun. 12, 2012  (JP) ................................ 2012-132810
Nov. 14, 2012  (JP) ................................ 2012-250516

(51) Int. Cl.
| | | |
|---|---|---|
| H01M 4/36 | (2006.01) | |
| H01M 10/054 | (2010.01) | |
| H01M 4/485 | (2010.01) | |
| H01M 4/505 | (2010.01) | |
| H01M 4/58 | (2010.01) | |
| C01B 25/45 | (2006.01) | |
| H01M 4/136 | (2010.01) | |
| H01M 4/02 | (2006.01) | |

(52) U.S. Cl.
CPC ............. *H01M 4/366* (2013.01); *C01B 25/45* (2013.01); *H01M 4/136* (2013.01); *H01M 4/36* (2013.01); *H01M 4/485* (2013.01); *H01M 4/505* (2013.01); *H01M 4/58* (2013.01); *H01M 4/5825* (2013.01); *H01M 10/054* (2013.01); *H01M 2004/028* (2013.01); *Y02E 60/122* (2013.01); *Y02P 70/54* (2015.11)

(58) Field of Classification Search
CPC ................ H01M 10/054; H01M 2004/028; H01M 4/136; H01M 4/36; H01M 4/366; H01M 4/485; H01M 4/505; H01M 4/58; H01M 4/5825; C01B 25/45

See application file for complete search history.

(56) References Cited

U.S. PATENT DOCUMENTS

| | | |
|---|---|---|
| 6,068,949 A | 5/2000 | Shackle |
| 6,200,704 B1 | 3/2001 | Katz et al. |
| 6,872,492 B2 | 3/2005 | Barker et al. |
| 2005/0136331 A1 | 6/2005 | Jouanneau-Si Larbi et al. |
| 2008/0213674 A1 | 9/2008 | Okada et al. |
| 2010/0035155 A1 | 2/2010 | Okada et al. |
| 2011/0086266 A1 | 4/2011 | Kondo |
| 2012/0021273 A1 | 1/2012 | Ohmori et al. |
| 2012/0199785 A1 | 8/2012 | Saka |
| 2014/0197358 A1 | 7/2014 | Nose |
| 2015/0280215 A1 | 10/2015 | Nose |

FOREIGN PATENT DOCUMENTS

| | | | |
|---|---|---|---|
| CA | 2750707 A1 | 12/2002 | |
| CN | 1630126 A | 6/2005 | |
| CN | 1677718 A | 10/2005 | |
| CN | 101558518 A | 10/2009 | |
| CN | 102509789 A | 6/2012 | |
| EP | 2752925 A1 | 7/2014 | |
| GB | WO 2013045905 A1 * | 4/2013 | ............. C01B 25/42 |

(Continued)

OTHER PUBLICATIONS

H. Kim, I. Park, D.-H. Seo, S. Lee, S.-W. Kim, W. J. Kwon, Y.-U. Park, C. S. Kim, S. Jeon, K. Kang. New Iron-Based Mixed-Polyanion Cathodes for Lithium and Sodium Rechargeable Batteries: Combined First Principles Calculations and Experimental Study, Supporting Information, S1-S19, J. Am. Chem. Soc. 2012, 134, 10369-10372.*
M. Nose, H. Nakayama, K. Nobuhara, H. Yamaguchi, S. Nakanishi, H. Iba. Na4Co3(PO4)2P2O7: A novel storage material for sodium-ion batteries, Journal of Power Sources 234 (2013) 175-179.*
M. Nose, K. Nobuhara, S. Shiotani, H. Nakayama, S. Nakanishia and H. Iba. Electrochemical Li+ insertion capabilities of Na4-xCo3(PO4)2P2O7 and its application to novel hybrid-ion batteries, RSC Adv., 2014, 4, 9044.*
Partial translation of OGUMI, "Richiumu niji-denchi (Lithium secondary batteries)", 2008, pp. 77-81, submitted Dec. 21, 2015.
Partial translation of Communication dated Mar. 4, 2016, issued by the State Intellectual Property Office of the P.R.C. in corresponding Chinese Application No. 2013800305910.

(Continued)

*Primary Examiner* — Carlos Barcena
(74) *Attorney, Agent, or Firm* — Sughrue Mion, PLLC

(57) ABSTRACT

The invention is to provide a positive electrode material for sodium batteries, which has high operating potential and enable charging and discharging at high potential, and a method for producing thereof. Disclosed is a positive electrode material for sodium batteries, comprising positive electrode active material particles represented by the following general formula (1), and an electroconductive carbonaceous material that coats at least part of the surface of the positive electrode active material particles: General Formula (1): $Na_xM_y(AO_4)_z(P_2O_7)_w$ wherein M is at least one selected from the group consisting of Ti, V, Cr, Mn, Fe, Co, Ni, Cu and Zn; A is at least one selected from the group consisting of Al, Si, P, S, Ti, V and W; x is a value that satisfies $4 \geq x \geq 2$; y is a value that satisfies $4 \geq y \geq 1$; z is a value that satisfies $4 \geq x \geq 0$; w is a value that satisfies $1 \geq w \geq 0$; and at least one of z and w is 1 or more.

6 Claims, 6 Drawing Sheets

(56) References Cited

FOREIGN PATENT DOCUMENTS

| JP | 2004-158348 A | 6/2004 |
|---|---|---|
| JP | 2005183395 A | 7/2005 |
| JP | 2008260666 A | 10/2008 |
| JP | 2010260761 A | 11/2010 |
| KR | 10-2014-0041911 A | 4/2014 |
| WO | 02097907 A2 | 12/2002 |
| WO | 2005043647 A2 | 5/2005 |
| WO | 2009053823 A2 | 4/2009 |
| WO | 2010110465 A1 | 9/2010 |
| WO | 2011038499 A1 | 4/2011 |
| WO | 2011043482 A1 | 4/2011 |
| WO | 2013/031331 A1 | 3/2013 |
| WO | 2013/045905 A1 | 4/2013 |

OTHER PUBLICATIONS

J. Barker et al., "$Li_{4/3}Ti_{5/3}O_4$ II $Na_3V_2(PO_4)_2F_3$: An Example of a Hybrid-Ion Cell Using a Non-graphitic Anode", Journal of The Electrochemical Society, 2007, vol. 154, No. 9, pp. A882-A887.

Jianqing Zhao et al., "A novel sol-gel synthesis route to $NaVPO_4F$ as cathode material for hybrid lithium ion batteries", Journal of Power Sources, 2010, vol. 195, pp. 6854-6859.

B. L. Ellis et al., "A multifunctional 3.5 V iron-based phosphate cathode for rechargeable batteries", Nature Materials, Oct. 2007, vol. 6, pp. 749-753.

Communication dated Feb. 18, 2016, issued by the U.S. Patent and Trademark Office in corresponding U.S. Appl. No. 14/440,104.

Nose et al. "Novel Cathode Materials of Sodium-containing Metal Phosphates as Highly Voltage Sodium-ion Batteries", Battery Research Division, Toyota Motor Corporation, Oct. 10, 2012; pp. 5-7 (3 pages total).

Communication dated Oct. 1, 2015, issued by the U.S. Patent and Trademark Office in corresponding U.S. Appl. No. 14/241,188.

Kuroda et al., Electrochemical Properties of Spinel-type Oxide Anodes in Sodium-Ion Battery, Abstract #389, 218th ECS Meeting, © 2010 The Electrochemical Society, 1 page total.

Didier et al., "Study of the $NaxVO2$ phases : structures and electrochemistry", LiBD-5 2011—Electrode materials—Arcachon, France, Jun. 12-17, 2011, 1 page total.

Komaba et al., "Electrochemical intercalation activity of layered $NaCrO2$ vs. $LiCrO2$", Elsevier, Electrochemistry Communications, 2010, vol. 12, pp. 355-358.

Berthelot et al., "Electrochemical investigation of the P2-$NaxCoO2$ phase diagram", Nature Materials, Jan. 2011, vol. 10, pp. 74-80.

Ogumi, "Richiumu niji-denchi (Lithium secondary batteries)", 2008, pp. 77-81.

Kim et al., "New Iron-Based Mixed-Polyanion Cathodes for Lithium and Sodium Rechargeable Batteries: Combined Forst Principles Calculations and Experimental Study", Journal of the American Chemical Society, 2012, vol. 134, pp. 10369-10372.

Essehli et al., "Synthesis, crystal structure and infrared spectroscopy of a new non-centrosymmetric mixed-anion phosphate $Na4Mg3(PO4)2(P2O7)$", Journal of Alloys and Compounds, 2010, vol. 493, pp. 654-660.

Trad et al., "A Layered Iron(III) Phosphate Phase, $Na3Fe3(PO4)4$: Synthesis, Structure, and Electrochemical Properties as Positive Electrode in Sodium Batteries", Journal of Physical Chemistry C, 2010, vol. 114, No. 21, pp. 10034-10044.

Abstract for Korean Application No. 2014-7005138 (Korean Publication No. 2014-0041911), 1 page total.

Sanz F et al: "Synthesis, structural characterization, magnetic properties, and ionic conductivity of $Na4M<II>3(P04)2(P207)$ ($M<II>$ = Mn, Co, N i )", Chemistry of Materials American Chem. Soc. USA, vol. 13, No. 4, Apr. 2001 (Apr. 2001), pp. 1334-1340, XP002742401, ISSN: 0897-4756 * the whole document *.

Francisca Sanz et al: "Crystal Structure, Magnetic Properties, and Ionic Conductivity of a New Mixed-Anion Phosphate $Na4Ni5(P04)2(P207)2$", Chemistry of Materials, vol. 11, No. 10, Oct. 1, 1999 (Oct. 1, 1999), pp. 2673-2679, XP055049856,ISSN: 0897-4756, DOI: 10.1021/cin981105s * the whole document *.

Communication from United States Patent and Trademark Office issued Jun. 28, 2016 in U.S. Appl. No. 14/241,188.

Non-Final Office Action from the United States Patent and Trademark Office issued Jun. 9, 2016 in U.S. Appl. No. 14/440,104.

F. Sanz et al., "$Na_4Co_3(PO_4)_2P_2O_7$, a New Sodium Cobalt Phosphate Containing a Three-Dimensional System of Large Intersecting Tunnels," Journal of Solid State Chemistry 123, pp. 129-139 (1996), Article No. 0161.

* cited by examiner

POSITIVE ELECTRODE MATERIAL FOR SODIUM BATTERIES AND METHOD FOR PRODUCING SAME

CROSS REFERENCE TO RELATED APPLICATIONS

This application is a National Stage of International Application No. PCT/JP2013/063217 filed May 10, 2013, claiming priority based on Japanese Patent Application Nos. 2012-132810 filed Jun. 12, 2012 and 2012-250516 filed Nov. 14, 2012, the contents of all of which are incorporated herein by reference in their entirety.

TECHNICAL FIELD

The present invention relates to a positive electrode material for sodium batteries, and a method for producing same.

BACKGROUND ART

In recent years, with the rapid spread of IT-related devices and communication devices such as personal computers, video cameras and cellular phones, emphasis is placed on the development of batteries that can be used as the power source for such devices. In the automobile industry, the development of high-output and high-capacity batteries for electric vehicles and hybrid vehicles has been promoted. Among various kinds of batteries, a lithium battery attracts attention due to its high energy density and power output.

In a lithium battery, generally, a lithium metal complex oxide having a layered structure, such as lithium nickelate or lithium cobaltate, is used as the positive electrode active material, and a carbonaceous material that is able to occlude/release lithium ions, a lithium metal, a lithium alloy or the like is used as the negative electrode active material. As the electrolyte disposed between the positive and negative electrodes, a liquid electrolyte in which a lithium salt is dissolved, a lithium-containing solid electrolyte or the like is used.

As described above, lithium batteries are excellent in energy density and power output. On the other hand, they have bottlenecks such as an increase in lithium prices with an increased demand for lithium batteries, and limited lithium reserves, thus preventing them from entering into mass production or making it enlarged.

Therefore, studies of sodium batteries are in progress, in which sodium, which is a plentiful resource and low in cost, is used in place of lithium. For example, Patent Literature 1 discloses a positive electrode active material for non-aqueous electrolyte secondary batteries, which is represented by $Ma_xMb_yP_2O_7$ (Ma is Na, Li, Ca or Mg; Mb is a transition metal being stably present at tetravalent or higher valent condition; x is a value that satisfies $0 \leq x \leq 4$; y is a value that satisfies $0.5 \leq y \leq 3$; and z is a value that satisfies $6 \leq z \leq 14$). In Patent Literature 1, the positive electrode active material which was actually produced and evaluated under "Examples" is $MoP_2O_7$.

CITATION LIST

Patent Literature 1: Japanese Patent Application Laid-Open No. 2004-158348

SUMMARY OF INVENTION

Technical Problem

However, in the case where the $MoP_2O_7$ produced and evaluated under "Examples" of Patent Literature 1 is used as the positive electrode active material of a sodium battery, there is a problem of low operating potential. Also, the operating potential of positive electrode active materials which are commonly used at present is about 3.5 V at the highest.

Also, the $MoP_2O_7$ actually produced and evaluated in Patent Literature 1 does not contain Na. Therefore, when the $MoP_2O_7$ is used as the positive electrode active material of a sodium battery, the operation of the sodium battery is needed to be started by insertion of Na ions (discharge reaction). Accordingly, the negative electrode active material to be used in combination is needed to be an active material containing Na. However, there has been no report of Na-containing negative electrode active material that is operable in low potential range and ensures sufficient electromotive force, and there is a problem in achieving the practical use.

An active material with small electron conductivity has large electrical resistance upon charging and discharging and, as a result, faces a problem of decreased capacity. Therefore, excellent electron conductivity is required of active materials.

The present invention was achieved in light of the above circumstance. An object of the present invention is to provide a positive electrode material for sodium batteries, which has high operating potential, enables charging and discharging at high potential, and has excellent electron conductivity, and a method for producing the positive electrode material.

Solution to Problem

The positive electrode material for sodium batteries according to the present invention comprises positive electrode active material particles represented by the following general formula (1), and an electroconductive carbonaceous material that coats at least part of the surface of the positive electrode active material particles:

  General Formula (1):

wherein M is at least one selected from the group consisting of Ti, V, Cr, Mn, Fe, Co, Ni, Cu and Zn; A is at least one selected from the group consisting of Al, Si, P, S, Ti, V and W; x is a value that satisfies $4 \geq x \geq 2$; y is a value that satisfies $4 \geq y \geq 1$; z is a value that satisfies $4 \geq z \geq 0$; w is a value that satisfies $1 \geq w \geq 0$; and at least one of z and w is 1 or more.

The positive electrode material for sodium batteries according to the present invention has high operating potential and excellent electron conductivity. Therefore, according to the present invention, an increase in energy density of sodium batteries and an increase in initial discharge capacity, initial charge-discharge efficiency, and discharge capacity after charge-discharge cycles can be realized.

In the formula (1), the M is preferably divalent before charging. This is because, when the M becomes a high oxidation state of trivalent or higher upon charging, operation at high potential is allowed.

The positive electrode active material preferably has a crystal structure attributed to space group $Pn2_1a$. This is because when the positive electrode active material has the crystal structure attributed to space group $Pn2_1a$, all Na ions in the crystal structure are aligned in any one of a-axis, b-axis and c-axis directions, and this is highly beneficial for Na ion conduction.

A preferred detailed embodiment of the positive electrode active material for sodium batteries according to the present invention, is that the M in the general formula (1) is at least one selected from the group consisting of Mn, Co and Ni, and part thereof allows to be substituted with at least one that is different from the M and selected from the group consisting of Ti, V, Cr, Mn, Fe, Co, Ni, Cu and Zn. Such a positive electrode active material for sodium batteries can easily have the crystal structure attributed to space group $Pn2_1a$ and is excellent in Na ion conductivity.

A more preferred detailed embodiment of the positive electrode active material is that the M in the general formula (1) is Mn, and part of the Mn allows to be substituted with at least one selected from the group consisting of Ti, V, Cr, Fe, Co, Ni, Cu and Zn.

Also, a preferred embodiment of the positive electrode active material is that the A is P, and part of the P allows to be substituted with at least one selected from the group consisting of Al, Si, S, Ti, V and W. In such an embodiment, the positive electrode active material can easily have the crystal structure attributed to space group $Pn2_1a$ and is excellent in Na ion conductivity.

A concrete example of the positive electrode active material used in the present invention is a positive electrode active material represented by the general formula $Na_4Mn_3(PO_4)_2(P_2O_7)$.

The method for producing a positive electrode material for sodium batteries according to the present invention, is a method for producing a positive electrode material for sodium batteries, the material comprising positive electrode active material particles represented by the following general formula (1), and an electroconductive carbonaceous material that coats at least part of the surface of the positive electrode active material particles:

$$Na_xM_y(AO_4)_z(P_2O_7)_w \qquad \text{General Formula (1)}$$

wherein M is at least one selected from the group consisting of Ti, V, Cr, Mn, Fe, Co, Ni, Cu and Zn; A is at least one selected from the group consisting of Al, Si, P, S, Ti, V and W; x is a value that satisfies $4 \geq x \geq 2$; y is a value that satisfies $4 \geq y \geq 1$; z is a value that satisfies $4 \geq z \geq 0$; w is a value that satisfies $1 \geq w \geq 0$; and at least one of z and w is 1 or more, the method comprising the steps of:

preparing a complex containing the positive electrode active material particles and the electroconductive carbonaceous material adhering through a pressing process to the surface of the positive electrode active material particles, by pressing and allowing the electroconductive carbonaceous material to adhere to the surface of the particles by mechanochemical treatment, and heat-treating the complex under an inert atmosphere or reduction atmosphere.

According to the present invention, a positive electrode material for sodium batteries, which has high operating potential and excellent electron conductivity, can be produced. Also according to the present invention, an increase in energy density of sodium batteries and an increase in initial discharge capacity, initial charge-discharge efficiency, and discharge capacity after charge-discharge cycles can be realized.

In the general formula (1), the M is preferably divalent before charging.

The positive electrode active material used in the production method of the present invention preferably has a crystal structure attributed to space group $Pn2_1a$.

A preferred detailed embodiment of the positive electrode active material is that the M in the general formula (1) is at least one selected from the group consisting of Mn, Co and Ni, and part thereof allows to be substituted with at least one that is different from the M and selected from the group consisting of Ti, V, Cr, Mn, Fe, Co, Ni, Cu and Zn.

A more preferred detailed embodiment of the positive electrode active material is that the M in the general formula (1) is Mn, and part of the Mn allows to be substituted with at least one selected from the group consisting of Ti, V, Cr, Fe, Co, Ni, Cu and Zn.

Also, a preferred detailed embodiment of the positive electrode active material is that the A in the general formula (1) is P, and part of the P allows to be substituted with at least one selected from the group consisting of Al, Si, S, Ti, V and W. In such an embodiment, the positive electrode active material can easily have the crystal structure attributed to space group $Pn2_1a$ and is excellent in Na ion conductivity.

A concrete example of the positive electrode active material is one represented by the general formula $Na_4Mn_3$  $(PO_4)_2(P_2O_7)$.

Advantageous Effects of Invention

According to the present invention, a positive electrode material for sodium batteries, which has high operating potential and excellent electron conductivity, and a method for producing the positive electrode material, can be provided.

DESCRIPTION OF EMBODIMENTS

Figure 1:
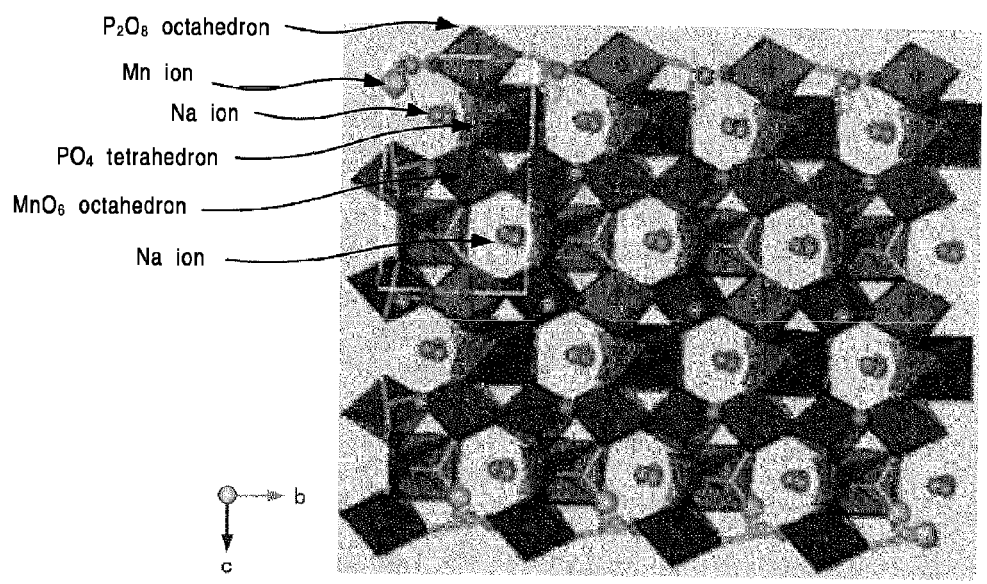
FIG. 1 is a view of the crystal structure of space group $Pn2_1a$, when being viewed from the a-axis direction.

Hereinafter, the positive electrode material for sodium batteries according to the present invention (hereinafter may be simply referred to as positive electrode material) and the method for producing that will be described in detail.

[Positive Electrode Material for Sodium Batteries]

The positive electrode material for sodium batteries according to the present invention comprises positive electrode active material particles represented by the following general formula (1), and an electroconductive carbonaceous material that coats at least part of the surface of the positive electrode active material particles:

   General Formula (1)

wherein M is at least one selected from the group consisting of Ti, V, Cr, Mn, Fe, Co, Ni, Cu and Zn; A is at least one selected from the group consisting of Al, Si, P, S, Ti, V and W; x is a value that satisfies $4 \geq x \geq 2$; y is a value that satisfies $4 \geq y \geq 1$; z is a value that satisfies $4 \geq z \geq 0$; w is a value that satisfies $1 \geq w \geq 0$; and at least one of z and w is 1 or more.

As described above, the operating potential of conventional general positive electrode active materials for sodium batteries is as low as about 3.5 V or less.

In the case of replacing Li of an active material for lithium batteries by Na, the operation potential tends to be significantly decreased. In addition, since the ionic radius of Na ions is larger than Li ions, it has conventionally been considered that when Li of an Li-containing active material is replaced by Na, Na ions become difficult to move. Due to these reasons, it has been generally considered that a beneficial active material for high potential operating type sodium batteries cannot be obtained even if lithium in an active material for lithium batteries is simply replaced by sodium.

However, the inventor of the present invention found that the compound represented by the general formula (1) $Na_xM_y(AO_4)_z(P_2O_7)_w$ can be used as the positive electrode active material for sodium batteries and is operable in a high potential range of 3.0 to 5.0 V.

In addition, the positive electrode active material can exhibit high potential operability at a relatively low temperature of 25° C.

The reason the compound represented by the general formula (1) $Na_xM_y(AO_4)_z(P_2O_7)_w$ is operable in high potential range as the positive electrode active material for sodium batteries, is considered as follows. That is, in the general formula (1), the M is an electrochemically-active, divalent or higher transition metal. Also, the M is Mn which was confirmed to have high potential operability (see "Examples"), or those having an ionic radius which is close to that of Mn.

Also in the general formula (1), A is P which was confirmed to have high potential operability (see "Examples"), or those easy to have a tetrahedral structure, as well as P. The tetrahedral structure is the structure of a tetrahedron with four oxygen atoms at the vertices and one A which is disposed in an inner space of the tetrahedron and is covalently bound to the four oxygen atoms.

As for $(AO_4)$ and $(P_2O_7)$, which constitute a polyanionic site, it is considered as follows: when at least one of z, which is the compositional ratio of $(AO_4)$ in the positive electrode active material, and w, which is the compositional ratio of $(P_2O_7)$ in the same, is 1 or more, due to the inductive effect exerted on the M-O bond by at least one of $(AO_4)$ and $(P_2O_7)$, the positive electrode active material thus obtained is operable in high potential range. The inductive effect is such an effect that due to high covalent bonding character of the A-O and P—O bonds, the A-O bond constituting $(AO_4)$ and the P—O bond constituting $(P_2O_7)$, electrons of the M-O bond are pulled toward the A-O and P—O bonds, decreasing in covalent bonding character between M and O and lowering energy gap in hybrid orbital; therefore, the oxidation-reduction level of M is decreased, widening energy gap with sodium and increasing oxidation-reduction potential of counter sodium.

The inventor of the present invention succeeded in achieving a certain result in exhibiting the high potential operability of a sodium battery, by using the compound represented by the general formula (1) as the positive electrode active material of a sodium battery.

In the general formula (1), however, it was found that depending on the type of the M, the electron conductivity of the positive electrode active material is decreased. In particular, when the M is Mn, compared to the case where the M is a metal other than Mn, the electron conductivity of the positive electrode active material is as very low as $1.0 \times 10^{-12}$ S/cm or less. Therefore, when the M is Mn, there is such a problem that the positive electrode active material has large internal resistance upon charging and discharging and obtains small density of capacity, which is as small as about 18 mAh/g.

As a result of diligent research, the inventor of the present invention found the following: by pressing and allowing the electroconductive carbonaceous material to adhere to the surface of the positive electrode active material particles by mechanochemical treatment and by heat-treating the same, at least part of the surface of the positive electrode active material particles can be coated with the electroconductive carbonaceous material; moreover, by using the thus-obtained positive electrode material for sodium batteries in the positive electrode of a sodium battery, the low electron conductivity problem of the positive electrode active material in which the M is Mn, can be solved.

In the present invention, what is meant by saying that the electroconductive carbonaceous material coats at least part of the surface of the positive electrode active material particles, is as follows: on at least part of the surface of the positive electrode active material particles, the crystal phase of the positive electrode active material is in contact with the amorphous phase of the electroconductive carbonaceous material.

Whether or not the surface of the positive electrode active material particles is coated with the electroconductive carbonaceous material can be confirmed by observing the surface of the positive electrode active material particles in the positive electrode material for sodium batteries with a transmission electron microscope (TEM).

Due to electronic diffraction by TEM, the positive electrode active material particles, which are crystal, can be confirmed to be a phase (crystal phase) having a grid pattern derived from its periodic structure.

Meanwhile, since the electroconductive carbonaceous material is amorphous, it is confirmed to be a phase that does not have the grid pattern as shown in the positive electrode active material.

Accordingly, if a part in which the crystal phase of the positive electrode active material having the grid pattern is in close contact with the amorphous phase of the electroconductive carbonaceous material having no grid pattern can be observed on the positive electrode active material surface by TEM observation, it can be said that the electroconductive carbonaceous material coats at least part of the surface of the positive electrode active material particles.

The TEM observation condition is not particularly limited, as long as an electron diffraction pattern can be confirmed. For example, the TEM observation is preferably carried out at 200,000- to 500,000-fold magnification.

The area of the positive electrode active material particle surface coated with the electroconductive carbonaceous material is preferably as large as possible. It is preferable that the whole surface of the positive electrode active material is coated with that.

In the present invention, the reason why the low electron conductivity problem of the positive electrode active material can be solved is considered as follows. That is, this is because the electron conductivity of the positive electrode active material can be aided by, as described above, coating at least part of the surface of the positive electrode active material particles with the electroconductive carbonaceous material at the atomic level.

The positive electrode material for sodium batteries according to the present invention has excellent electron conductivity; therefore, by using the material in the positive electrode of a sodium battery, the initial discharge capacity, initial charge-discharge efficiency and discharge capacity after charge-discharge cycles of the sodium battery, can be dramatically increased.

Hereinafter, the components of the positive electrode material of the present invention will be described in detail.

In the positive electrode active material used in the positive electrode material of the present invention, the M is at least one metal species selected from the group consisting of Ti, V, Cr, Mn, Fe, Co, Ni, Cu and Zn. It is preferable that the M is divalent before charging. This is because, in the case where the M is a metal species that is divalent before charging, when the M becomes a high oxidation state of trivalent or higher upon charging, operation at high potential is allowed.

Also, the M is particularly preferably at least one selected from the group consisting of Mn, Co and Ni, because Mn, Co and Ni are divalent before charging. Part of each of these Mn, Co and Ni allows to be substituted with at least one that is different from the M (that is, at least one selected from the group consisting of Mn, Co and Ni) and selected from the group consisting of Ti, V, Cr, Mn, Fe, Co, Ni, Cu and Zn.

According to the present invention, the electroconductive carbonaceous material can aid the electron conductivity of the positive electrode active material and ensure high electron conductivity. Therefore, as with the case where the M is Mn even in the case where the electron conductivity of the positive electrode active material itself is low, the electron conductivity of the positive electrode active material can be increased, thus allowing to make the suitable positive electrode active material. The Mn allows to be substituted with at least one selected from the group consisting of Ti, V, Cr, Fe, Co, Ni, Cu and Zn.

In the positive electrode active material used in the positive electrode material of the present invention, the A is at least one selected from the group consisting of Al, Si, P, S, Ti, V and W. The A is preferably at least one selected from the group consisting of Si, P and S. This is because Si, P and S are particularly easy to form a tetrahedral structure, and Si and S can form a crystal structure similar to that of P. It is particularly preferable that the A is P. Part of these Si, P and S may be substituted with at least one that is different from the A (that is, at least one selected from the group consisting of Si, P and S) and selected from the group consisting of Al, Si, P, S, Ti, V and W.

In the general formula (1), x is a value that satisfies $4 \geq x \geq 2$; y is a value that satisfies $4 \geq y \geq 1$; z is a value that satisfies $4 \geq z \geq 0$; w is a value that satisfies $1 \geq w \geq 0$; and at least one of z and w is 1 or more.

It is preferable that the z and w are both 1 or more. When the z and w are both 1 or more, the polyanionic site contains the $AO_4$ tetrahedron and the $P_2O_7$ which shares one oxygen with the $AO_4$ tetrahedron; therefore, the inductive effect on the M-O bond is increased, so that a positive electrode active material with higher potential can be obtained.

In the present invention, as a concrete example of the positive electrode active material, there may be mentioned a compound represented by $Na_4Mn_3(PO_4)_2(P_2O_7)$. The reason is as follows: the compound represented by $Na_4Mn_3(PO_4)_2(P_2O_7)$ contains Mn, which is a redox element, and $(PO_4)$ and $(P_2O_7)$, which serve as a polyanionic site; therefore, it ensures high electron conductivity due to the above-described electroconductive carbonaceous material aiding to provide electrical conductivity, and it has high potential operability due to the high inductive effect. In addition, since the M is Mn, it is hard to ensure sufficient electron conductivity if M is as it is; therefore, it can be said that the effect of increasing electron conductivity by coating with the electroconductive carbonaceous material is particularly high.

Figure 2:
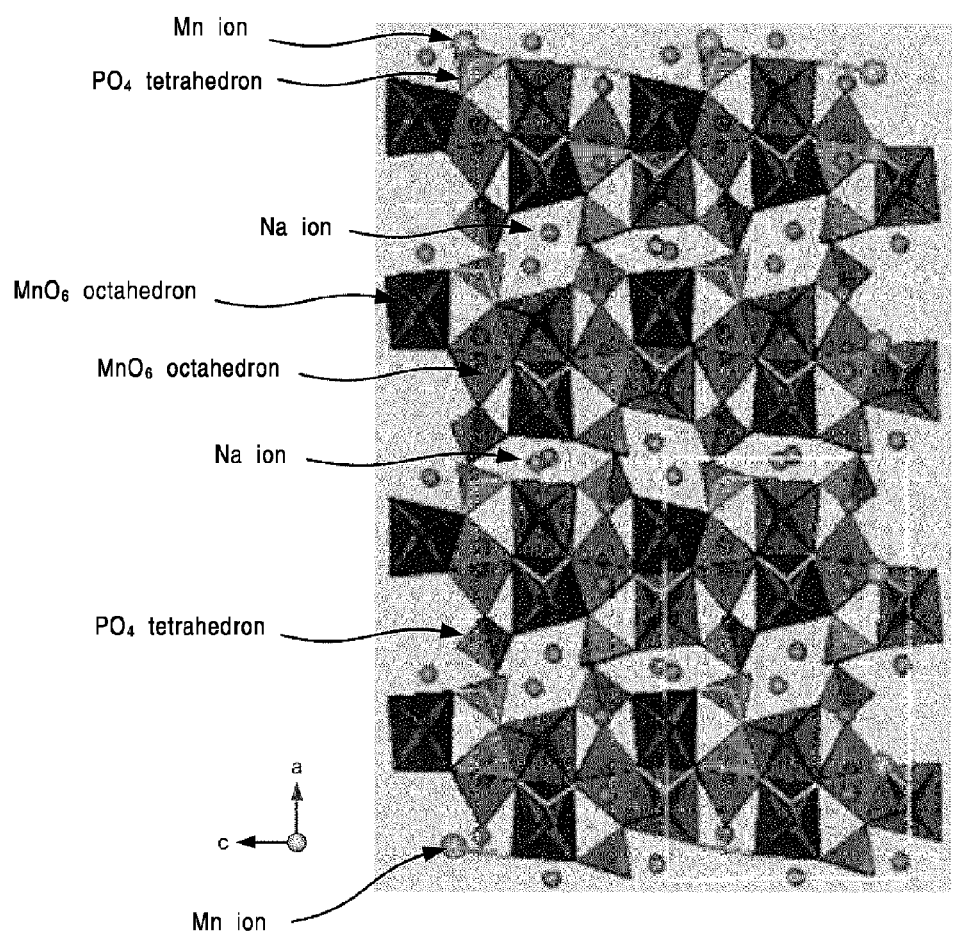
FIG. 2 is a view of the crystal structure of space group $Pn2_1a$, when being viewed from the b-axis direction.
Figure 3:
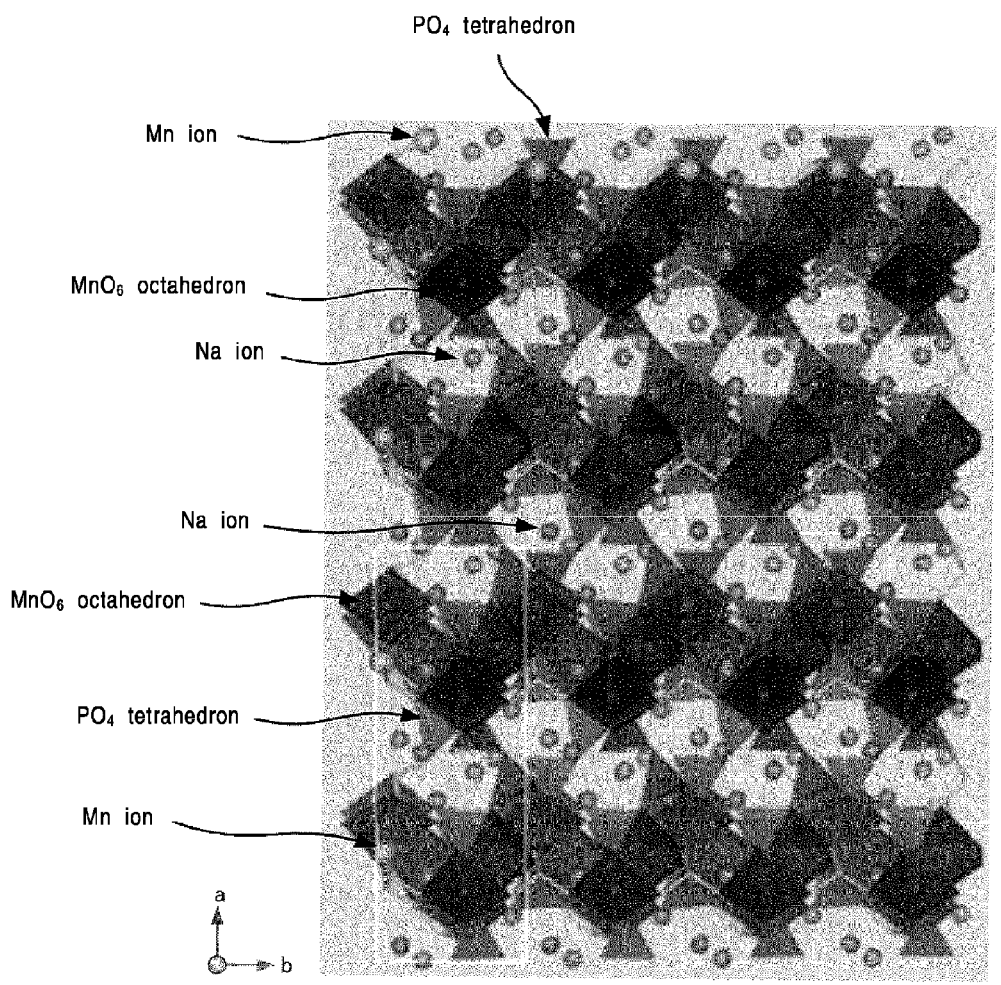
FIG. 3 is a view of the crystal structure of space group $Pn2_1a$, when being viewed from the c-axis direction.

Also, $Na_4Mn_3(PO_4)_2(P_2O_7)$ has a crystal structure attributed to space group $Pn2_1a$. FIGS. 1 to 3 show the crystal structures attributed to space group $Pn2_1a$ ($Na_4Mn_3(PO_4)_2(P_2O_7)$) when being viewed from the a-axis direction (FIG. 1), from the b-axis direction (FIG. 2) and from the c-axis direction (FIG. 3).

As is clear from FIGS. 1 to 3, in the crystal structure attributed to space group $Pn2_1a$, all Na ions in the crystal structure are aligned in any one of the a-axis, b-axis and c-axis directions, and the mobility of the Na ions is very high. That is, the crystal structure attributed to space group $Pn2_1a$ is highly beneficial for Na ion conduction, and insertion and desorption of Na ions proceed smoothly.

Due to the above reasons, it is preferable that the positive electrode active material in the positive electrode material of the present invention has a crystal structure attributed to space group $Pn2_1a$.

The average particle diameter of the positive electrode active material particles is not particularly limited. For example, it is within a range of 1 nm to 100 μm, preferably within a range of 10 nm to 30 μm. The average particle diameter of the positive electrode active material particles can be measured by a scanning electron microscope (SEM), transmission electron microscope (TEM), etc.

The method for producing the positive electrode active material particles is not particularly limited. For example, there may be mentioned a method comprising a pre-calcining step and a main calcining step, in which the pre-calcining step is a step of calcining a raw material mixture containing at least an Na-containing compound, an M-containing compound, an A-containing compound and a P-containing compound at 150 to 500° C. under the air atmosphere, and the main calcining step is a step of calcining the resulting pre-calcined product obtained by the pre-calcining step at 500 to 800° C. under the air atmosphere.

As just described, first, the raw material mixture is subjected to the pre-calcining at a temperature of 150 to 500° C., which is a lower temperature than the main calcining step, and then subjected to the main calcining at 500 to 800° C.; therefore, the reaction uniformly proceeds and a single-phase positive electrode active material can be synthesized.

The Na-containing compound, M-containing compound, A-containing compound, and P-containing compound are raw materials for the positive electrode active material $Na_xM_y(AO_4)_z(P_2O_7)_w$, and they will be an Na source, M source, A source and P source, respectively.

The Na-containing compound, M-containing compound, A-containing compound and P-containing compound are not particularly limited and can be appropriately selected. Each compound can be one kind of compound or a combination of two or more kinds of compounds. Also, one compound may be a compound containing two or more of Na, M, A and P. When M and A contains common atoms, the M-containing compound and the A-containing compound may be the same compound. When A is P, the A-containing compound and the P-containing compound may be the same compound.

Examples of the Na-containing compound, which is the Na source, include $Na_4P_2O_7$, $Na_2CO_3$, $Na_2O$, $Na_2O_2$, $Na_3PO_4$ and $CH_3COONa$.

Examples of the M-containing compound, which is the M source, include the following: Ti-containing compounds such as $TiO_2$ and $Ti_2O_3$; V-containing compounds such as $V_2O_3$, $V_2O_5$ and $NH_4VO_3$; Cr-containing compounds such as $Cr_2O_3$ and $_{Cr}(NO_3)_3$; Mn-containing compounds such as $MnCO_3$ and $(CH_3COO)_2Mn$; Fe-containing compounds such as $FeO$, $Fe_2O_3$ and $Fe(NO_3)_3$; Co-containing compounds such as $CoCO_3$, $(CH_3COO)_2Co$, $CoO$ and $Co_2O_3$; Ni-containing compounds such as $(CH_3COO)_2Ni$, $NiCO_3$ and $NiO$; Cu-containing compounds such as $(CH_3COO)_2Cu$ and $CuO$; and Zn-containing compounds such as $(CH_3COO)_2Zn$ and $ZnO$.

Examples of the A-containing compound, which is the A source, include the following: Al-containing compounds such as $Al(NO_3)_3$, $Al_2O_3$ and $Al(OH)_3$; Si-containing compounds such as $SiO_2$ and $SiO$; P-containing compounds such as $NH_4H_2PO_4$, $(NH_4)_2HPO_4$, $H_3PO_4$, $Na_2P_2O_7$ and $Na_3PO_4$; S-containing compounds such as $(NH_4)_2SO_4$, $Na_2SO_4$ and $H_2SO_4$; Ti-containing compounds such as $TiO_2$ and $Ti_2O_3$; V-containing compounds such as $V_2O_3$, $V_2O_5$ and $NH_4VO_3$; and W-containing compounds such as $WO_3$ and $Na_2WO_4$.

Examples of the P-containing compound, which is the P source, include $Na_4P_2O_7$, $NH_4H_2PO_4$, $(NH_4)_2HPO_4$, $H_3PO_4$, $Na_2P_2O_7$ and $Na_3PO_4$.

The ratio of the Na-containing compound, M-containing compound, A-containing compound and P-containing compound contained in the raw material mixture can be appropriately decided, depending on the x, y, z and w in the $Na_xM_y(AO_4)_z(P_2O_7)_w$ to be synthesized. Typically, the compounds may be mixed so that the ratio (mol ratio) of Na, M, A and P in the raw material mixture is expressed as follows: Na:M:A:P=x:y:z:2w.

The method for preparing the raw material mixture is not particularly limited, and a desired mixing method or stirring method can be used.

The size of the particles of the compounds is not particularly limited. For progress of uniform reaction, it is preferable that the contact area between the particles is large. Therefore, it is preferable to grind the compounds before the pre-calcining. That is, before the pre-calcining, it is preferable to have a grinding step to grind the Na-containing compound, M-containing compound, A-containing compound and P-containing compound contained in the raw material mixture. In the grinding step, the compounds may be ground at the same time, or they may be ground one by one. The grinding method is not particularly limited and can be a desired method, and it may be a method that carries out a mixing or stirring process and a grinding process of the raw material mixture at once. For example, a ball mill and bead mill can mix and stir the raw material mixture, with grinding the same.

The pre-calcining temperature is lower than the main calcining step and within a range of 150 to 500° C. It is preferably 180 to 450° C., more preferably 250 to 350° C. The pre-calcining time is not particularly limited and can be appropriately determined. For example, it may be about 1 to 5 hours.

The air atmosphere of the pre-calcining step means an oxygen-containing gas atmosphere.

In the main calcining step, the pre-calcined product obtained by the pre-calcining step is calcined at 500 to 800° C. under the air atmosphere.

The calcining temperature of the main calcining step is preferably 550 to 750° C.

The main calcining time is not particularly limited and can be appropriately determined. For example, it may be about 1 to 30 hours.

The air atmosphere of the main calcining step is the same as the air atmosphere of the pre-calcining step.

The method for producing the positive electrode active material particles is not limited to the above method. For example, the particles can be produced by the following method: first, the Na-containing compound, which is the Na source, the M-containing compound, which is the M source, the A-containing compound, which is the A source, and the P-containing compound, which is the P source, are dissolved in an acidic solution, in combination with a gelling agent, followed by heating, thus preparing a gel; thereafter, the gel is calcined under the air atmosphere.

The Na-containing compound, M-containing compound, A-containing compound and P-containing compound are soluble in acidic solution and can be appropriately selected. Each compound may be one kind of compound or a combination of two or more kinds of compounds. Also, one compound may be a compound containing two or more of Na, M, A and P. When M and A contains common atoms, the M-containing compound and the A-containing compound may be the same compound. When A is P, the A-containing compound and the P-containing compound may be the same compound.

Concrete examples of the Na-containing compound include $Na_4P_2O_7$, $Na_2CO_3$, $Na_2O$, $Na_2O_2$ and $CH_3COONa$.

Examples of the M-containing compound include the following: Ti-containing compounds such as $TiO_2$, $Ti_2O_3$ and $Ti(NO_3)_4$; V-containing compounds such as $V_2O_3$ and $V_2O_5$; Cr-containing compounds such as $Cr(NO_3)_3$; Mn-containing compounds such as $MnCO_3$, $MnO$, $MnO_2$ and $(CH_3COO)_2Mn$; Fe-containing compounds such as $Fe(NO_3)_3$, $FeC_2O_4$ and $(CH_3COO)_3Fe$; Co-containing compounds such as $CoCO_3$, $(CH_3COO)_2Co$ and $Co_2O_3$; Ni-containing compounds such as $(CH_3COO)_2Ni$; Cu-containing compounds such as $(CH_3COO)_2Cu$; and Zn-containing compounds such as $(CH_3COO)_2Zn$.

Example of the A-containing compound include the following: Al-containing compounds such as $Al(NO_3)_3$; Si-containing compounds such as $(CH_3CH_2O)_4Si$; P-containing compounds such as $NH_4H_2PO_4$, $(NH_4)_2HPO_4$ and $H_3PO_4$; S-containing compounds such and $Ti(NO_3)_4$; V-containing compounds such as $V_2O_3$ and $V_2O_5$; and W-containing compounds such as $WO_3$ and $Na_2WO_4$.

Examples of the P-containing compound include $NH_4H_2PO_4$, $(NH_4)_2HPO_4$ and $H_3PO_4$.

The ratio of the Na-containing compound, M-containing compound, A-containing compound and P-containing compound in the raw material mixture can be appropriately determined, as with the pre-calcining step, depending on the x, y, z and w in the $Na_xM_y(AO_4)_z(P_2O_7)_w$ to be synthesized.

Examples of the gelling agent include glycolic acid. Examples of the acidic acid solution include a nitric acid aqueous solution.

In the gel preparation, the heating temperature is a temperature at which the compounds can be dissolved in the acidic solution and the gel can be prepared. For example, it may be 60 to 120° C.

The gel calcining temperature may be 500 to 800° C., for example. It is preferably 600 to 750° C. The air atmosphere upon the gel calcining is the same as the air atmosphere of the pre-calcining step.

The electroconductive carbonaceous material is not particularly limited, as long as it can aid the electron conductivity of the positive electrode active material. For example, there may be mentioned acetylene black, graphite and Ketjen black.

The content of the electroconductive carbonaceous material in the positive electrode material is not particularly limited. From the viewpoint of obtaining electron conductivity aiding effects, it is preferably 1% by weight or more, particularly preferably 5% by weight or more. From the viewpoint of obtaining a sufficient amount of the positive electrode active material, it is preferably 35% by weight or less.

The thickness of the electroconductive carbonaceous material coating the surface of the positive electrode active material particles is not particularly limited. It is preferably 1 to 30 nm.

In the present invention, for the purpose of improving cycle characteristics, oxidation and pressure resisting characteristics, high-rate discharge characteristics, storage characteristics and so on, the positive electrode active material particles may contain elements such as Li, Mg, Al, Ca, Sr, Y, Zr, Nb, Mo, Pd, Ag, In, Sn, Sb, Ba, Hf, Ta, W, Ir, Bi and the lanthanoid elements (e.g., La, Ce, Pr, Nd, Sm, Eu, Gd, Dy, Er, Yb).

Also in the present invention, for the purpose of improving cycle characteristics, oxidation and pressure resisting characteristics, high-rate discharge characteristics, storage characteristics and so on, the whole or part of the surface of the positive electrode active material particles may be coated with at least one selected from the group consisting of metals including Li, Na, Mg, Al, Si, Ca, Ti, V, Cr, Mn, Fe, Co, Ni, Cu, Zn, Sr, Y, Zr, Nb, Mo, Pd, Ag, In, Sn, Sb, Ba, Hf, Ta, W, Ir, Bi and lanthanoids (such as La, Ce, Pr, Nd, Sm, Eu, Gd, Dy, Er and Yb), oxides thereof, fluorides thereof, oxyfluorides thereof, phosphides thereof, nitrides thereof, sulfides thereof, carbides thereof, borides thereof, chlorides thereof, bromides thereof, iodides thereof, phosphates thereof, carbonates thereof, sulfates thereof, silicates thereof and titanates thereof. The thickness of the coating is not particularly limited and is preferably within a range of 1 nm to 200 nm. In the positive electrode active material particles having such a coating, the coating can be coated with the electroconductive carbonaceous material, or a part not coated with the coating can be coated with the electroconductive carbonaceous material.

Examples of the method for synthesizing the positive electrode active material containing the above elements include the following method: raw materials that serve as the sources of the above elements (such as compounds containing the above elements) are mixed with other raw materials for the positive electrode active material, and the resulting mixture is calcined by a solid-phase method or treated by a sol-gel method, hydrothermal method, coprecipitation method, etc., thus synthesizing the positive electrode active material, followed by heating as needed.

Examples of the method for synthesizing the positive electrode active material having the coating thereon include the following method: after synthesizing the positive electrode active material, the constituent material of the coating is applied to the surface of the positive electrode active material by a gas phase method (such as sputtering method, vacuum deposition method or atomic layer deposition (ALD) method), a liquid phase method (such as sol-gel method, hydrothermal method or coprecipitation method), a spin coating method, a spraying method, etc., followed by heating as needed.

The synthesis method is not limited to the above methods, and conventionally-known synthesizing processes can be widely used.

[Method for Producing a Positive Electrode Material]

The method for producing a positive electrode material according to the present invention is not particularly limited. As a preferable production method, there may be mentioned the following method.

The method for producing a positive electrode material for sodium batteries according to the present invention comprises the steps of: preparing a complex containing the positive electrode active material particles and the electroconductive carbonaceous material adhering through a pressing process to the surface of the positive electrode active material particles, by pressing and allowing the electroconductive carbonaceous material to adhere to the surface of the particles by mechanochemical treatment, and heat-treating the complex under an inert atmosphere or reduction atmosphere.

Hereinafter the steps of the positive electrode material production method of the present invention will be described.

(Preparation Step)

The preparation step is a step of preparing the complex containing the positive electrode active material particles and the electroconductive carbonaceous material adhering through a pressing process to the surface of the positive electrode active material particles, by pressing and allowing the electroconductive carbonaceous material to adhere to the surface of the particles by mechanochemical treatment.

The positive electrode active material particles and the electroconductive carbonaceous material will not be described here since they were described above under "Positive electrode material for sodium batteries".

The mechanochemical treatment is not particularly limited, as long as it can prepare the complex containing the positive electrode active material particles and the electroconductive carbonaceous material adhering through a pressing process to the surface of the positive electrode active material particles, by applying mechanical energy to the positive electrode active material particles and the electroconductive carbonaceous material and pressing and allowing the electroconductive carbonaceous material to adhere to the surface of the particles. Examples of the mechanochemical treatment include treatment using a planetary ball mill, bead mill, stone mill, etc.

In the case of using the planetary ball mill, the rotational speed is not particularly limited and may be 80 to 450 rpm, for example. The kneading time upon using the planetary ball mill is not particularly limited and may be 1 to 30 hours, for example.

In the case of using the planetary ball mill, the ball material is not particularly limited. For example, there may be mentioned zirconia, and a material with high hardness is preferable.

In the case of using the planetary ball mill, the ball diameter is not particularly limited and may be 1 to 10 mm, for example.

(Heat Treatment Step)

The heat treatment step is a step in which the complex obtained by the preparation step is subjected to heat treatment under an inert atmosphere or reduction atmosphere.

In the heat treatment, the lower limit of the heat treatment temperature is preferably 500° C. or more, more preferably 550° C. or more, particularly preferably 600° C. or more.

The upper limit of the heat treatment temperature is preferably 800° C. or less, more preferably 750° C. or less.

The heat treatment time is not particularly limited and can be appropriately determined. For example, it may be preferably 1 to 24 hours, more preferably 3 to 10 hours.

Examples of the inert atmosphere include an argon-containing gas atmosphere and a nitrogen-containing gas atmosphere. Examples of the reduction atmosphere include a hydrogen-containing gas atmosphere. By carrying out the heat treatment under the inert atmosphere or reduction atmosphere, damage caused by the combustion of carbon can be prevented.

[Sodium Battery]

The positive electrode material provided by the present invention can be suitably used in the positive electrode of a sodium battery. The sodium battery may be a primary or secondary battery. Hereinafter, as an example, a sodium secondary battery using the positive electrode material provided by the present invention will be described.

Figure 4:
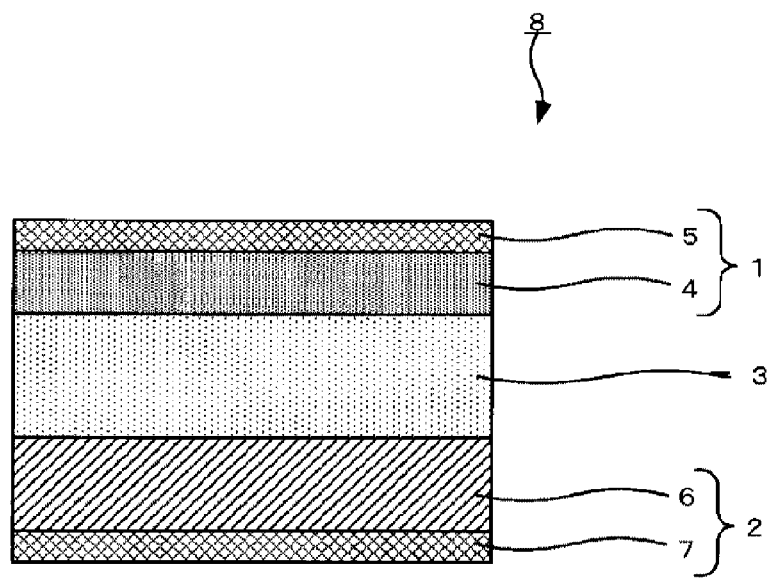
FIG. 4 is a schematic sectional view of one embodiment of a sodium battery example.

FIG. 4 is a schematic sectional view of one embodiment of a sodium battery example. As shown in FIG. 4, a sodium secondary battery 8 generally has a structure in which an electrolyte layer 3 is disposed so as to be present between a negative electrode 1 and a positive electrode 2. The negative electrode 1 has a negative electrode active material layer 4, which contains a negative electrode active material, and a negative electrode current collector 5, which collects current from the negative electrode active material layer 4. The positive electrode 2 has a positive electrode active material layer 6, which contains a positive electrode active material, and a positive electrode current collector 7, which collects current from the positive electrode active material layer 6.

Hereinafter, these components will be described.

The negative electrode contains the negative electrode active material which is able to release and take up sodium ions. In general, the negative electrode has the negative electrode active material layer, which contains at least the negative electrode active material, and the negative electrode current collector as needed, which collects current from the negative electrode active material layer.

Examples of the negative electrode active material include, but are not limited to, Na metals, titanium oxides (such as $Na_2Ti_3O_7$, $Na_2Ti_6O_{13}$, $TiO_2$ and $Li_4Ti_5O_{12}$), carbon (such as hard carbon, carbon microspheres and carbon nanotubes), those that are able to form alloy with Na (such as metal species or compounds containing at least one element selected from the group consisting of Sn, Sb, Pb, Ge, Se, S, Te, Tl and Si), those that cause conversion reaction (such as $Co_3O_4$, $Fe_2O_3$, SnO, $MoO_3$ and $NiCoO_4$), $Y_2Ti_2O_5S_2$ and $NaTi_2(PO_4)_3$.

The negative electrode active material layer may be a layer which contains only the negative electrode active material or a layer which contains, in addition to the negative electrode active material, a binder, an electroconductive material, an electrolyte, etc. For example, when the negative electrode active material is in a plate or foil form, the negative electrode layer can be a layer which contains only the negative electrode active material. On the other hand, when the negative electrode active material is in a powdery form, the negative electrode layer can be a layer which contains the negative electrode active material and a binder.

Examples of the binder include, but are not limited to, polyvinylidene fluoride (PVdF), polytetrafluoroethylene (PTFE), styrene-butadiene rubber (SBR), polyimide, polyacrylamide, celluloses (such as carboxymethyl cellulose (CMC), polyacrylate (such as sodium polyacrylate) and known electroconductive polymers.

Examples of the electroconductive material include carbonaceous materials such as carbon black, activated carbon, carbon fibers (e.g., carbon nanotubes and carbon nanofibers) and graphite.

The thickness of the negative electrode active material layer varies widely depending on the structure of the target sodium secondary battery. For example, it is preferably within a range of 0.1 μm to 1,000 μm.

The positive electrode generally contains the positive electrode active material which is able to release and take up sodium ions. In the present invention, the positive electrode has the positive electrode active material layer, which contains at least the positive electrode material for sodium batteries that contains the positive electrode active material particles represented by the general formula (1) and the electroconductive carbonaceous material coating at least part of the surface of the positive electrode active material particles, and the positive electrode current collector as needed, which collects current from the positive electrode active material layer.

As the positive electrode material, there may be used at least one of the positive electrode material of the present invention or a positive electrode material produced by the production method of the present invention.

The positive electrode active material layer may be a layer which contains only the positive electrode material or a layer which contains, in addition to the positive electrode material, an electroconductive material, a binder, an electrolyte, an electrode catalyst, etc. The electroconductive material and binder used in the positive electrode active material layer will not be described here since the same materials as those of the negative electrode active material layer can be used.

For the purpose of improving cycle characteristics, oxidation and pressure resisting characteristics, high-rate discharge characteristics, storage characteristics and so on, at least one selected from the group consisting of the following substances may be contained in the positive electrode active material layer and/or on a surface of the positive electrode active material layer: metals including Li, Na, Mg, Al, Si, Ca, Ti, V, Cr, Mn, Fe, Co, Ni, Cu, Zn, Sr, Y, Zr, Nb, Mo, Pd, Ag, In, Sn, Sb, Ba, Hf, Ta, W, Ir, Bi and lanthanoids (such as La, Ce, Pr, Nd, Sm, Eu, Gd, Dy, Er and Yb), oxides thereof, fluorides thereof, oxyfluorides thereof, phosphides thereof, nitrides thereof, sulfides thereof, carbides thereof, borides thereof, chlorides thereof, bromides thereof, iodides thereof, phosphates thereof, carbonates thereof, sulfates thereof, silicates thereof, titanates thereof, known positive electrode materials for Li secondary batteries, and known positive electrode materials for Na secondary batteries.

The content of the metals and metal compounds in the positive electrode active material layer is not particularly limited. It is preferably within a range of 0.1% by weight to 35% by weight.

The thickness of the positive electrode active material layer varies widely depending on the structure of the target sodium secondary battery. For example, it may be within a range of 0.1 μm to 1,000 μm, particularly preferably within a range of 0.1 μm to 300 μm.

The negative electrode active material layer and the positive electrode active material layer can be formed by, for example, applying a slurry that contains the above materials by a desired method such as a dip coating method, spray coating method, roller coating method, doctor blade method, gravure coating method or screen printing method, drying the applied slurry and, as needed, pressing the same.

As the method for producing the positive electrode active material layer containing the above metal(s) and/or metal compound(s), there may be mentioned the following method, for example.

That is, at the time of forming the positive electrode active material layer, the above metal(s) and/or metal compound(s) can be contained in the positive electrode active material layer by mixing a predetermined amount of the powder of the above metal(s) and/or metal compound(s) with other materials for the positive electrode active material layer.

In other method, after forming the positive electrode active material layer by using materials other than the above metal(s) and/or metal compound(s), a surface of the positive electrode active material layer is coated with the above metal(s) and/or metal compound(s) by a gas phase method (such as sputtering method, vacuum deposition method or ALD method), a liquid phase method (such as sol-gel method or hydrothermal method), a spin coating method or spraying, followed by heating as needed, thereby forming the positive electrode active material layer containing the above metal(s) and/or metal compound(s) on a surface thereof. In a still other method, a surface of the positive electrode current collector is coated in advance with the above metal(s) and/or metal compound(s) by a gas phase method (such as sputtering method, vacuum deposition method or ALD method), a liquid phase method (such as sol-gel method or hydrothermal method), a spin coating method or spraying, followed by heating as needed, thereby forming the positive electrode active material layer on the coated surface of the positive electrode current collector. Thus, the positive electrode active material layer containing the above metal(s) and/or metal compound(s) can be formed on a surface thereof.

However, the method for producing the positive electrode active material layer containing the above metal(s) and/or metal compound(s) is not limited to these methods.

The material, structure and form of the positive and negative electrode current collectors are not particularly limited, as long as the current collectors have a desired electron conductivity and are made of a material which does not cause alloying reaction with sodium ions under the environment inside the battery.

Examples of the material for the positive electrode current collector include metal materials such as stainless-steel, nickel, aluminum, iron, titanium and copper; carbonaceous materials such as carbon fiber and carbon paper; and high electron conductive ceramic materials such as titanium nitride. The battery case may also function as the positive electrode current collector.

Examples of the material for the negative electrode current collector include copper, stainless-steel, nickel and aluminum. The battery case may also function as the negative electrode current collector.

Examples of the form of the positive and negative electrode current collectors include a plate form, a foil form and a mesh form. Preferred is a mesh form.

The electrolyte layer contains at least an electrolyte that enables sodium ion conduction between the positive electrode and the negative electrode.

The electrolyte has sodium ion conductivity, and examples thereof include a liquid electrolyte, a gel electrolyte obtained by gelling a liquid electrolyte with a polymer, and a solid electrolyte.

Examples of the liquid electrolyte having sodium ion conductivity include a liquid electrolyte obtained by dissolving sodium salt in an aqueous or non-aqueous solvent.

The non-aqueous solvent is not particularly limited. Examples thereof include: cyclic carbonates such as propylene carbonate (PC), ethylene carbonate (EC) and fluoroethylene carbonate (FEC); cyclic esters such as γ-butyrolactone (GBL); chain carbonates such as dimethyl carbonate (DMC), diethyl carbonate (DEC) and ethyl methyl carbonate (EMC); ester-based solvents such as methyl acetate, ethyl acetate, methyl difluoroacetate and ethyl trifluoroacetate; glymes such as tetraglyme and triglyme; and cyclic ether-based solvents such as furan, 2,5-dimethylfuran, tetrahydropyran and dioxane.

As the non-aqueous solvent, an ionic liquid may be also used. Examples thereof include: an ionic liquid using quaternary ammonium as a cation (such as (N,N,N-trimethyl-N-propylammonium bis(trifluoromethanesulfonyl)imide (i.e., TMPA TFSI)); an ionic liquid using piperidinium as a cation (such as (N-methyl-N-propylpiperidinium bis(trifluoromethanesulfonyl)imide (i.e., PP13 TFSI)); pyrrolidinium (such as (N-butyl-N-methylpyrrolidinium bis(trifluoromethanesulfonyl)imide (i.e., P14 TFSI)); N,N-diethyl-N-methyl-N-(2-methoxyethyl)ammonium bis(trifluoromethanesulfonyl)imide (i.e., DEME TFSI); an ionic liquid using quaternary phosphonium as a cation (such as triethylpentylphosphonium bis(trifluoromethanesulfonyl)imide (i.e., P2225 TFSI) and triethyloctylphosphonium bis(trifluoromethanesulfonyl)imide (i.e., P2228 TFSI)); and an ionic liquid using imidazolium as a cation (such as 1-ethyl-3-methylimidazolium bis(trifluoromethanesulfonyl)imide). In the above concrete examples, bis(trifluoromethanesulfonyl)imide (TFSI) is shown as an example of the anion species. The above-exemplified cation species can be combined with anion species such as bis(sulfonyl)imide (i.e., FSI), tetrafluoroborate ($BF_4^-$) and hexafluorophosphate ($PF_6^-$).

These non-aqueous solvents may be used alone or in combination of two or more kinds. The non-aqueous solvent may be mixed with a nitrile-based compound in which a CN group is bound to a terminal of a chain saturated hydrocarbon compound (such as adiponitrile, acetonitrile, propionitrile or glutaronitrile), a cyclic sulfone (such as sulfolane or 3-methylsulfolane) or a phosphoric ester (such as trimethyl phosphate or triethyl phosphate) and used. By adding the nitrile-based compound to the non-aqueous solvent-based liquid electrolyte, there can be obtained a non-aqueous solvent-based liquid electrolyte which is stable so as not to decompose even in a high potential range in which the positive electrode material for sodium batteries according to the present invention is operated.

The sodium salt is not particularly limited. Examples thereof include $NaPF_6$, $NaBF_4$, $NaClO_4$, $NaCF_3SO_3$, $(CF_3SO_2)_2NNa$, $NaN(FSO_2)$ and $NaC(CF_3SO_2)_3$. These sodium salts may be used alone or in combination of two or more kinds. Particularly preferred is $NaPF_6$, which is stable in high potential range.

In the non-aqueous liquid electrolyte, the concentration of the sodium salt is, for example, within a range of 0.1 mol/dm$^3$ to 5 mol/dm$^3$, preferably within a range of 0.5 mol/dm$^3$ to 1.5 mol/dm$^3$. This is because when the sodium salt concentration is too high, there is a possibility of an increase in viscosity and which may cause a decrease in capacity at low temperature; moreover, when the sodium salt concentration is too low, there is a possibility of a decrease in capacity at high rate.

The non-aqueous liquid electrolyte can be gelled and used by adding a polymer thereto. As the method for gelling the non-aqueous liquid electrolyte, for example, there may be mentioned a method of adding a polymer such as polyethylene oxide (PEO), polyacrylonitrile (PAN), polyvinylidene fluoride (PVdF) or polymethyl methacrylate (PMMA) to the non-aqueous liquid electrolyte.

The solid electrolyte is not particularly limited, as long as it has Na ion conductivity. Examples of oxide solid electrolytes include $Na_3Zr_2Si_2PO_{12}$ and beta-alumina solid electrolyte (such as $Na_2O-11Al_2O_3$). Examples of sulfide solid electrolytes include $Na_2S-P_2S_5$. Examples of complex hydride solid electrolytes include $Na_2(BH_4)(NH_2)$. If any of these solid electrolytes is mixed in the positive electrode and the negative electrode, a sodium secondary battery is also allowed to function as an all-solid-state battery.

The solid electrolyte may be non-crystalline or crystalline. The average particle diameter ($D_{50}$) of the solid electrolyte is, for example, within a range of 1 nm to 100 μm, preferably within a range of 10 nm to 30 μm. The average particle diameter ($D_{50}$) of the solid electrolyte can be measured by a scanning electron microscope (SEM) or transmission electron microscope (TEM), for example.

In the case of using the liquid electrolyte as the electrolyte, insulation between the positive and negative electrodes can be obtained by disposing a separator, which is an insulating porous material, between the positive and negative electrodes and impregnating the separator with the liquid electrolyte. Examples of the separator include porous films such as a polyethylene porous film and a polypropylene porous film, and non-woven fabrics such as a resin non-woven fabric and a glass fiber non-woven fabric.

The thickness of the electrolyte layer varies widely depending on the structure of the target sodium secondary battery. For example, it is within a range of 0.1 μm to 1,000 μm, preferably within a range of 0.1 μm to 300 μm.

As the battery case for housing the negative electrode, the electrolyte layer and the positive electrode, for example, one in a general form such as a coin form, flat plate form, cylindrical form or laminate form can be used.

In the case of a battery having a structure in which a plurality of laminates, each comprising the positive electrode, the electrolyte layer and the negative electrode in order, are layered, from the viewpoint of safety, a separator made of an insulating material can be disposed between the positive electrode and the negative electrode. Examples of such a separator include porous films such as a polyethylene porous film and a polypropylene porous film, and non-woven fabrics such as a resin non-woven fabric and a glass fiber non-woven fabric.

Also, a terminal can be provided to each of the current collectors of the electrodes, which serves as a connection to the outside.

EXAMPLES

Example 1

Synthesis of Positive Electrode Material for Sodium Batteries

First, $Na_4P_2O_7$ (Na-containing compound), $(CH_3COO)_2Mn$ (Mn-containing compound) and $NH_4H_2PO_4$ (P-containing compound) were mixed at a ratio of Na:Mn:P=4:3:4 (mol ratio). The mixture and glycolic acid (gelling agent) were dissolved in a nitric acid aqueous solution and stirred at 80° C. The resulting mixture was calcined under the air atmosphere at 700° C. for 15 hours, thus obtaining positive electrode active material particles.

The powder of the thus-obtained positive electrode active material particles and Ketjen black were mixed at a ratio of 5:1 (weight ratio). The mixture was kneaded by a planetary ball mill (zirconia ball) at 300 rpm for 24 hours to press and allow the electroconductive carbonaceous material to adhere to the surface of the positive electrode active material particles, thus preparing a complex.

The powder of the complex was heat-treated under an Ar atmosphere at 700° C. for 5 hours, thus obtaining a positive electrode material for sodium batteries.

Evaluation of Positive Electrode Material for Sodium Batteries

<Production of Positive Electrode>

The positive electrode material synthesized above, carbon and PVdF were mixed at the following ratio: $Na_4Mn_3(PO_4)_2P_2O_7$ (the positive electrode active material particles in the positive electrode material):Ketjen black (the electroconductive carbonaceous material in the positive electrode material):carbon (conductive additive):PVdF (binder)=75:15:5:5 (weight ratio). The mixture was dispersed in N-methyl-2-pyrrolidone (dispersant) to prepare a slurry.

The slurry was applied on an aluminum foil (current collector), dried and roll-pressed, thus producing a positive electrode in which the current collector and the positive electrode active material layer were layered.

<Production of Evaluation Cell>

A counter electrode was stamped out from a foil of sodium metal.

A mixed solvent in which ethylene carbonate (EC) and dimethyl carbonate (DMC) were mixed at a ratio of 1:1 (volume ratio) was mixed with sodium salt ($NaPF_6$) to obtain a non-aqueous solvent-based liquid electrolyte having a sodium salt concentration of 1.0 mol/dm$^3$.

The positive electrode produced above, a porous film in which a polypropylene porous film, a polyethylene porous film and a polypropylene porous film were layered in this order (separator), and the counter electrode were layered in this order. At this time, the positive electrode was placed so that the positive electrode active material layer faced the separator.

The separator of the resulting laminate was impregnated with the non-aqueous solvent-based liquid electrolyte, thus producing an evaluation cell in a coin form.

<Evaluation Method>

Figure 5:
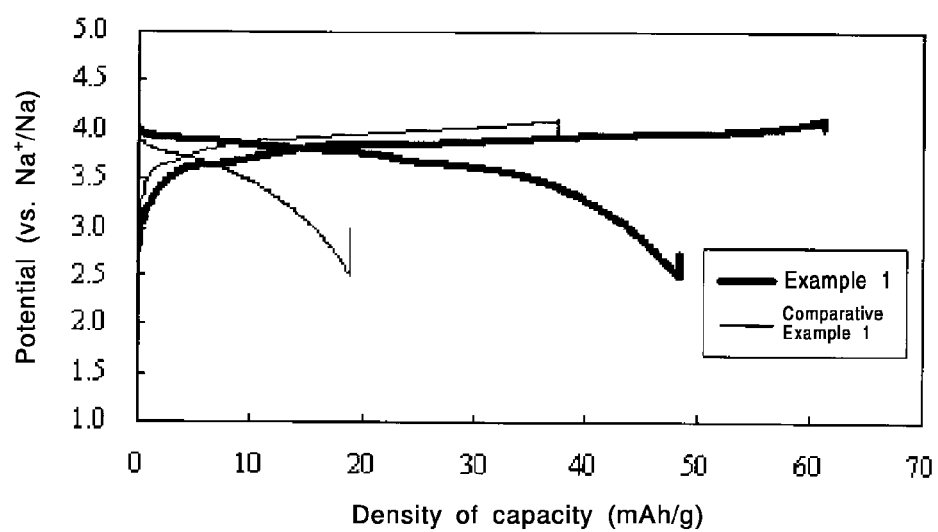
FIG. 5 shows initial charge-discharge curves of Example 1 and Comparative Example 1.
Figure 6:
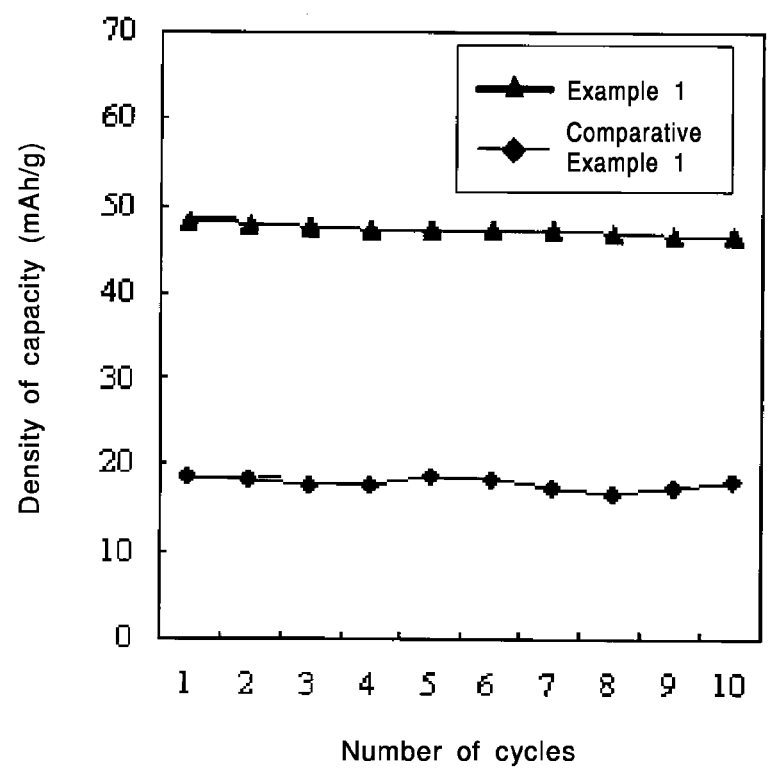
FIG. 6 shows cycle characteristics of Example 1 and Comparative Example 1.

A charge-discharge test was carried out on the evaluation cell produced above, in the following condition. The results are shown in FIGS. 5 and 6.

Potential range: Upper limit 4.1 V, lower limit 2.5 V
Current density: 8.5 mA/g
Temperature: 25° C.
Number of cycles: 10

Comparative Example 1

Positive electrode active material particles were obtained in the same manner as Example 1. The positive electrode active material particles and the electroconductive carbonaceous material were not formed into a complex and were not heat-treated.

An evaluation cell was produced in the same manner as Example 1, except that the positive electrode active material synthesized above, carbon and PVdF were mixed at the following ratio: $Na_4Mn_3(PO_4)_2P_2O_7$ (positive electrode active material particles):carbon (conductive additive):PVdF (binder)=75:20:5 (weight ratio). A charge-discharge test was carried out on the thus-obtained evaluation cell, in the same manner as Example 1. The results are shown in FIGS. 5 and 6.

As shown in FIG. 5, it was confirmed that in comparison with Comparative Example 1, the initial discharge capacity (unit:mAh) of Example 1 is two or more times higher, and the charge-discharge efficiency of Example 1 was increased from 51% to 79%. As shown in FIG. 6, it was confirmed that Example 1 can keep a density of capacity (unit:mAh/g) which is two or more times higher than Comparative Example 1, even after 10 cycles.

Example 2

Synthesis of Positive Electrode Material for Sodium Batteries

First, $Na_4P_2O_7$ (Na-containing compound), $(CH_3COO)_2Co$ (Co-containing compound) and $NH_4H_2PO_4$ (P-containing compound) were mixed at a ratio of Na:Co:P=4:3:4 (mol ratio). The mixture and glycolic acid (gelling agent) were dissolved in a nitric acid aqueous solution and stirred at 80° C. The resulting mixture was calcined under the air atmosphere at 700° C. for 15 hours, thus obtaining positive electrode active material particles.

The powder of the thus-obtained positive electrode active material particles and Ketjen black were mixed at a ratio of 5:1 (weight ratio). The mixture was kneaded by a planetary ball mill (zirconia ball) at 300 rpm for 24 hours to press and allow the electroconductive carbonaceous material to adhere to the surface of the positive electrode active material particles, thus preparing a complex.

The powder of the complex was heat-treated under an Ar atmosphere at 700° C. for 5 hours, thus obtaining a positive electrode material for sodium batteries.

(Evaluation of Positive Electrode Material for Sodium Batteries)

<Production of Positive Electrode>

The positive electrode material synthesized above, carbon and PVdF were mixed at the following ratio: $Na_4Co_3(PO_4)_2P_2O_7$ (the positive electrode active material particles in the positive electrode material):Ketjen black (the electroconductive carbonaceous material in the positive electrode material):carbon (conductive additive):PVdF (binder)=75:15:5:5 (weight ratio). The mixture was dispersed in N-methyl-2-pyrrolidone (dispersant) to prepare a slurry.

The slurry was applied on an aluminum foil (current collector), dried and roll-pressed, thus producing a positive electrode in which the current collector and the positive electrode active material layer were layered.

<Production of Evaluation Cell>

Figure 7:
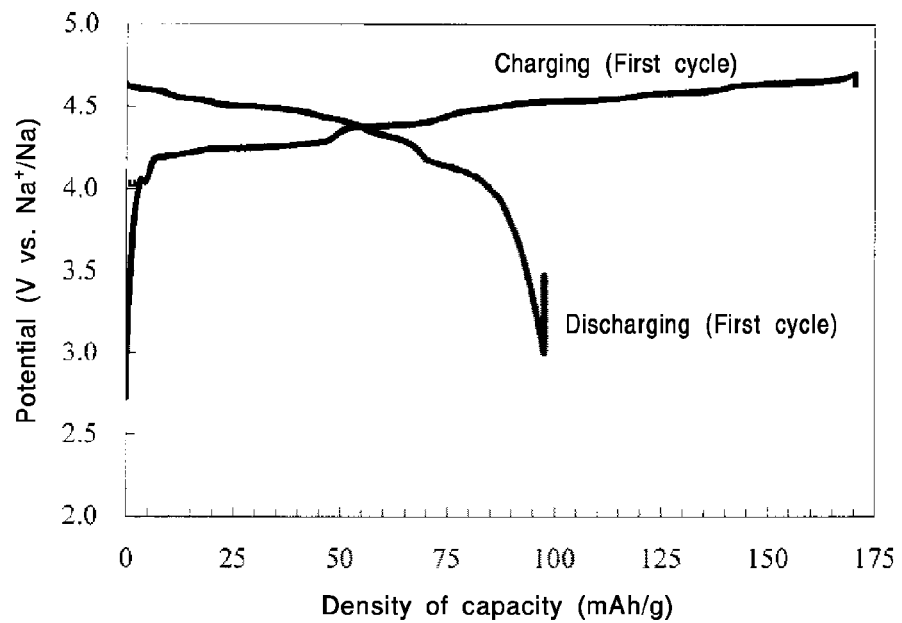
FIG. 7 shows charge-discharge test results of Example 2.

An evaluation cell in a coin form was produced in the same manner as Example 1. A charge-discharge test was carried out thereon in the following condition. The results are shown in FIG. 7.

Potential range: Upper limit 4.7 V, lower limit 3.0 V
Current density: 17 mA/g
Temperature: 25° C.

Comparative Example 2

Positive electrode active material particles were obtained in the same manner as Example 2. The positive electrode active material particles and the electroconductive carbonaceous material were not formed into a complex and were not heat-treated.

An evaluation cell was produced in the same manner as Example 2, except that the positive electrode active material synthesized above, carbon and PVdF were mixed at the following ratio: $Na_4Co_3(PO_4)_2P_2O_7$ (positive electrode active material particles):carbon (conductive additive):PVdF (binder)=75:20:5 (weight ratio). A charge-discharge test was carried out on the thus-obtained evaluation cell, in the same manner as Example 2. The results are shown in FIG. 8.

Figure 8:
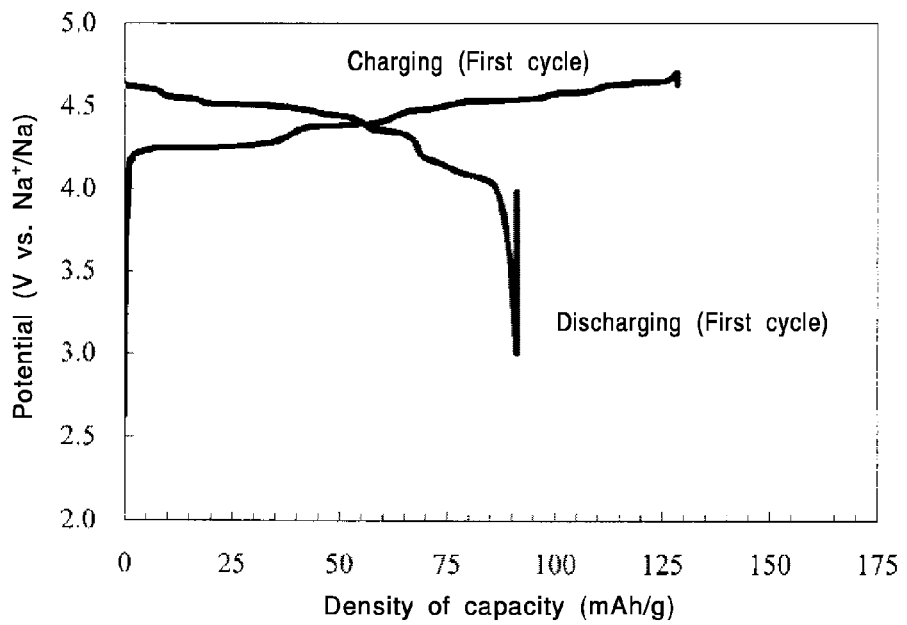
FIG. 8 shows charge-discharge test results of Comparative Example 2.

As shown in FIG. 8, the discharge capacity (initial discharge capacity) of Comparative Example 2 is 90 mAhg$^{-1}$. Meanwhile, as shown in FIG. 7, the discharge capacity (initial discharge capacity) of Example 2 is 98 mAhg$^{-1}$. As a result, it was confirmed that the discharge capacity of Example 2 was increased higher than Comparative Example 2.

REFERENCE SIGNS LIST

1. Negative electrode
2. Positive electrode
3. Electrolyte layer
4. Negative electrode active material layer
5. Negative electrode current collector
6. Positive electrode active material layer
7. Positive electrode current collector
8. Sodium secondary battery

The invention claimed is:

1. A positive electrode material for sodium batteries, comprising positive electrode active material particles having a crystal structure attributed to space group Pn2$_1$a and being represented by the following general formula (1), and an electroconductive carbonaceous material that coats at least part of the surface of the positive electrode active material particles:

$Na_4M_3(PO_4)_2(P_2O_7)$  General Formula (1):

wherein M is at least one selected from the group consisting of Mn, Co, and Ni.

2. The positive electrode material for sodium batteries according to claim 1, wherein the M in the general formula (1) is divalent before charging.

3. The positive electrode material for sodium batteries according to claim 1, wherein the positive electrode active material is represented by the general formula $Na_4Mn_3(PO_4)_2(P_2O_7)$.

4. A method for producing a positive electrode material for sodium batteries, the material comprising positive electrode active material particles having a crystal structure attributed to space group Pn2$_1$a and being represented by the following general formula (1), and an electroconductive carbonaceous material that coats at least part of the surface of the positive electrode active material particles:

$Na_4M_3(PO_4)_2(P_2O_7)$  General Formula (1):

wherein M is at least one selected from the group consisting of Mn, Co, and Ni, the method comprising the steps of:
preparing a complex containing the positive electrode active material particles and the electroconductive carbonaceous material adhering through a pressing process to the surface of the positive electrode active material particles, by pressing and allowing the electroconductive carbonaceous material to adhere to the surface of the particles by mechanochemical treatment, and
heat-treating the complex under an inert atmosphere or reduction atmosphere.

5. The method for producing a positive electrode material for sodium batteries according to claim 4, wherein the M is divalent before charging.

6. The method for producing a positive electrode material for sodium batteries according to claim 4, wherein the positive electrode active material is represented by the general formula $Na_4Mn_3(PO_4)_2(P_2O_7)$.

* * * * *